(12) United States Patent
Wootton et al.

(10) Patent No.: US 8,892,748 B1
(45) Date of Patent: Nov. 18, 2014

(54) SYSTEMS AND METHODS FOR ENABLING DATA COMMUNICATIONS TO A TELEPHONY DEVICE

(71) Applicant: Vonage Network, LLC, Holmdel, NJ (US)

(72) Inventors: Mark Wootton, Wall, NJ (US); Sagi Iltus, Hadera (IL)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/931,942

(22) Filed: Jun. 30, 2013

(51) Int. Cl.
*G06F 15/16* (2006.01)
*G06F 15/173* (2006.01)
*H04L 12/28* (2006.01)
*G06F 9/00* (2006.01)
*H04L 29/08* (2006.01)

(52) U.S. Cl.
CPC .................................. *H04L 67/145* (2013.01)
USPC .............. 709/227; 709/238; 370/351; 726/11

(58) Field of Classification Search
None
See application file for complete search history.

(56) References Cited

U.S. PATENT DOCUMENTS

| | | | |
|---|---|---|---|
| 6,765,931 B1 * | 7/2004 | Rabenko et al. .............. | 370/493 |
| 7,302,089 B1 | 11/2007 | Smits | |
| 7,417,981 B2 | 8/2008 | Holder et al. | |
| 8,090,850 B2 * | 1/2012 | Roach et al. .................. | 709/228 |
| 8,166,533 B2 * | 4/2012 | Yuan .............................. | 726/11 |
| 8,275,878 B2 * | 9/2012 | Goodman ..................... | 709/224 |
| 8,478,890 B2 * | 7/2013 | Chaturvedi et al. ........... | 709/231 |
| 8,533,312 B2 * | 9/2013 | Thakur et al. .................. | 709/223 |
| 8,599,858 B1 | 12/2013 | Mizrahi | |
| 8,607,323 B2 * | 12/2013 | Yuan ............................... | 726/11 |
| 2003/0005280 A1 * | 1/2003 | Bobde et al. .................. | 713/150 |
| 2004/0034793 A1 * | 2/2004 | Yuan .............................. | 713/200 |
| 2005/0226254 A1 * | 10/2005 | Vimpari ................... | 370/395.52 |
| 2007/0162341 A1 | 7/2007 | McConnell et al. | |
| 2009/0135837 A1 | 5/2009 | Mohaban | |
| 2009/0190757 A1 | 7/2009 | Chen et al. | |
| 2009/0222575 A1 * | 9/2009 | Goodman ..................... | 709/238 |
| 2009/0268712 A1 | 10/2009 | Bottiero et al. | |
| 2010/0039971 A1 | 2/2010 | Lor et al. | |
| 2010/0161809 A1 * | 6/2010 | Roach et al. .................. | 709/227 |
| 2010/0183151 A1 | 7/2010 | Wing et al. | |
| 2010/0281181 A1 | 11/2010 | Johnson et al. | |

(Continued)

OTHER PUBLICATIONS

Rosenberg, et. al, SIP: Session Initiation Protocol, The Internet Society (2002), 269 pages, RFC 3261.

(Continued)

*Primary Examiner* — Ranodhi Serrao
(74) *Attorney, Agent, or Firm* — Nixon & Vanderhye, P.C.

(57) ABSTRACT

Systems and methods for determining an interval for the transmission of keep alive messages that will prevent a pinhole of a data network interface device from closing are driven by a software client on a computing device. The software client informs a network server of a first time interval, and the server uses the first time interval to send communications to the computing device that trigger the computing device to send keep alive messages to the server. If the first time interval does not result in the pinhole closing, the software client instructs the network server to send messages to the computing device that trigger the computing device to send keep alive messages to the server according to a second, longer time interval. This process repeats until the pinhole ultimately closes, and then the last interval that did not cause the pinhole to close is selected for use.

29 Claims, 8 Drawing Sheets

(56) References Cited

U.S. PATENT DOCUMENTS

| | | |
|---|---|---|
| 2010/0312899 A1 | 12/2010 | Herzog et al. |
| 2011/0105097 A1* | 5/2011 | Tadayon et al. ............... 455/418 |
| 2011/0251992 A1* | 10/2011 | Bethlehem et al. ........... 707/610 |
| 2011/0255397 A1* | 10/2011 | Kadakia et al. ............... 370/216 |
| 2012/0036231 A1* | 2/2012 | Thakur et al. ................. 709/220 |
| 2012/0227101 A1* | 9/2012 | Yuan ............................... 726/12 |
| 2012/0260328 A1 | 10/2012 | Ravindranath et al. |
| 2012/0284385 A1 | 11/2012 | Kavanaugh et al. |
| 2013/0019025 A1* | 1/2013 | Chaturvedi et al. ........... 709/231 |
| 2013/0225145 A1 | 8/2013 | Cherian et al. |
| 2013/0246641 A1 | 9/2013 | Vimpari et al. |
| 2013/0263008 A1* | 10/2013 | Bylahalli et al. .............. 715/739 |

OTHER PUBLICATIONS

U.S. Appl. No. 13/931,941, filed Jun. 30, 2013, entitled "Systems and Methods for Enabling Data Communications to a Telephony Device".

U.S. Appl. No. 13/931,943, filed Jun. 30, 2014, entitled "Systems and Methods for Enabling Data Communications to a Telephony Device".

Rosenberg et al, "SIP: Session Initiation Protocol", The Internet Society, RFC 3261, 2002.

Office Action mailed Feb. 7, 2014 in U.S. Appl. No. 13/931,943.

Office Action mailed Oct. 17, 2013 in U.S. Appl. No. 13/931,941.

\* cited by examiner

SYSTEMS AND METHODS FOR ENABLING DATA COMMUNICATIONS TO A TELEPHONY DEVICE

BACKGROUND OF THE INVENTION

The invention is related to Internet Protocol (IP) telephony systems. More specifically, the invention is related to systems and methods for helping to ensure that an IP telephony system is always able to rapidly contact a user's telephony device for purposes of setting up new incoming communications that are directed to the user's telephony device.

Many computing devices obtain access to a data network, such as the Internet, via a data network interface device. The data network interface device could be a wired router, or a wireless router, such as a device offering WiFi service. The data network interface device can provide network address translation services, and may also operate in such a way as to prevent undesired or unauthorized data packets from being communicated from the data network to the computing device.

One way that a data network interface prevents unauthorized or undesired data packets from being communicated to a computing device is through a pinhole timer. In a typical pinhole timer scheme, each time that the computing device sends a communication to a server or computer at an Internet Protocol (IP) address, the data network interface device starts a pinhole timer associated with that IP address, and the port of the data network interface device being used by the computing device. The pinhole timer will run for a predetermined period of time, which may be configurable by the user. While the pinhole timer is running, the data network interface device will allow data packets coming from the IP address to be delivered back to the computing device. The assumption is that the original communication from the computing device to the server at the IP address requested information or data from that server. Thus, the data network interface device allows data packets coming from that server to be delivered to the computing device.

However, once the pinhole timer expires, the data network interface device blocks any further data packets from the IP address from being delivered to the computing device. Each time that the computing device sends a new communication to the same IP address, the pinhole timer relating to that IP address and port number is reset, and begins to again count down. The duration of the pinhole timer could be less than a minute, or as long as several minutes. So long as the computing device sends regular communications to the server at the IP address, the server is able to send data packets back to the computing device. But if the computing device does not send any new communications to the server for a period of time that is longer than the duration of the pinhole timer, the data network interface device blocks the server from sending new communications to the computing device.

The use of a pinhole timer on a data network interface device has ramifications for voice over Internet protocol (VOIP) telephony systems. In most instances, a user's telephony device communicates with the servers of a VOIP telephony system via data packets which traverse a data network, such as the Internet. The user's telephony device typically gains access to the Internet through a wired or wireless data network interface device which operates a pinhole timer.

When a user wishes to place an outgoing call, the user's telephony device sends a communication to a server of the IP telephony system, which starts a pinhole timer running on the data network interface device that provides the user's telephony device with access to the Internet. Thereafter, and for the duration of the call, there are frequent communications passing back and forth between the user's telephony device and the IP telephony system's server. Each time a new communication is sent from the user's telephony device to the IP telephony system server, the pinhole timer is reset. As a result, the pinhole timer does not expire while the call is ongoing, and the IP telephony system server is able to send communications back to the user's telephony device.

Once a call ends, however, there may be no reason for the user's IP telephony device to send any further communications to the IP telephony system server. Once the pinhole timer relating to that IP telephony system server expires, the data network interface device prevents any communications from the IP telephony system server from reaching the user's IP telephony device. This is a problem if the IP telephony system receives an incoming call directed to the user's telephony device. Because the user's data network interface device prevents the IP telephony system server from communicating with the user's IP telephony device, the IP telephony system cannot setup the new call to the user's telephony device.

One way to overcome this problem is for the user's telephony device to be configured to send periodic "keep alive" messages to the IP telephony system server. So long as keep alive messages are sent at time intervals shorter than the duration of the pinhole timer, the pinhole will remain open, and the IP telephony system server will be able to send communications to the user's IP telephony device for purposes of setting up a new incoming call, or for any other purpose.

Many types of IP telephony devices are configured to send periodic keep alive messages to the IP telephony system server to keep a pinhole open. For example, any IP telephony device which has a reliable and constant source of power can be configured in this fashion. However, if the IP telephony device is powered by a battery, constantly sending keep alive messages to the IP telephony system server can cause undesirable battery drain.

For example, some battery powered smart phones and other portable computing devices can run a software application which provides IP telephony capabilities. Such smart phones and portable computing devices often obtain access to the Internet via a wireless data network interface device which operates a pinhole timer. To ensure that a server of the IP telephony system is able to send a communication to an IP telephony software application that is running on such a portable computing device, the IP telephony software application must periodically send keep alive messages to the IP telephony system server, to ensure the pinhole does not close. However, as noted above, this can cause undesirable battery drain.

One way of dealing with this problem, in the case of smart phones, is through the use of push notifications. In this scheme, an IP telephony software application on a user's smart phone is configured so that it does not send periodic keep alive messages to the IP telephony system server. This means that the pinhole of the data network interface device that is being used will close. However, when the IP telephony system server needs to communicate with the IP telephony software application, such as when there is an incoming call for the user, the IP telephony system causes a push notification to be sent to the user's smart phone. When a push notification is delivered to the user's smart phone, and the user accepts the push notification, the IP telephony software application is run, and/or caused to register with the IP telephony system. And when the IP telephony software application sends a communication to the IP telephony system, a new pinhole is opened, and the IP telephony system can begin sending communications to the IP telephony software application on the user's smart phone.

While push notifications are operative to re-establish communications between the IP telephony system and the IP telephony software application on a user's smart phone, the process of requesting that a push notification to be sent, waiting for the push notification to be delivered, waiting for the user to accept or acknowledge the push notification, and then waiting for the IP telephony software application to send a communication to the IP telephony system can take a considerable amount of time. If the IP telephony system is attempting to setup a new incoming call that is directed to the user, the delay can be too long. In many cases, before the process can be completed, and the incoming call can be connected to the user's smart phone, the calling party decides that the call setup attempt has failed, and the calling party hangs up.

Because use of push notifications is problematic, it is instead desirable to configure an IP telephony software application on a user's smart phone (or other battery operated mobile computing device) to keep the pinhole open via alternate means. However, this desire competes with a desire to ensure that the battery of the user's device is not drained unnecessarily. One way to deal with these competing interests is to configure the IP telephony software application so that the user's mobile computing device sends messages to the IP telephony system servers as infrequently as possible, while still ensuring that the pinhole of the data network interface device does not close. However, pre-configuring the IP telephony software application or the IP telephony system servers in this fashion is all but impossible, because the duration of the pinhole timers on different data network interface devices varies considerably. Further, a user can re-configure the pinhole timer of a data network interface device to have a different duration than was originally set by the manufacturer.

In view of all of the foregoing, there is a need for systems and methods that can proactively adapt to existing conditions such that keep alive messages are sent as infrequently as possible to keep the pinhole of a data network interface device open.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
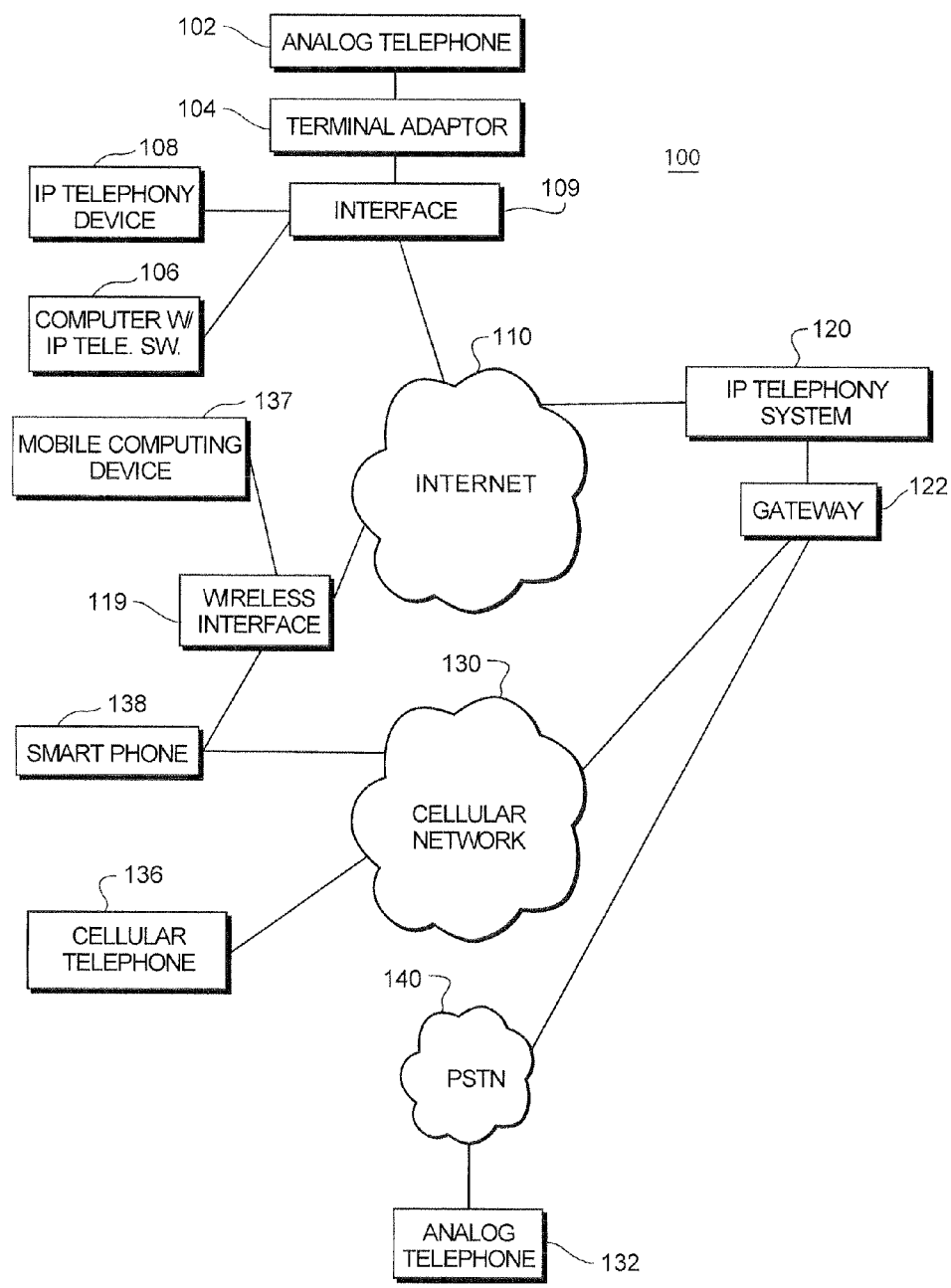
FIG. 1 is a diagram of a communications environment including various elements which are associated with an Internet protocol (IP) telephony system in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to a publicly switched telephone network (PSTN) 140 and/or a cellular network 130 via one or more gateways 122.

The gateway 122 allows users and devices that are connected to the PSTN 140 or cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110 via a data network interface 109. The IP telephone 108 could be connected to the data network interface 109 via a wired or wireless connection.

Alternatively, a customer could utilize a normal analog telephone 102 which is connected to the Internet 110 via a terminal adapter 104 and the data network interface 109. The terminal adapter 104 converts analog signals from the telephone 102 into data signals that pass over the Internet 110, and vice versa. Analog telephony devices include, but are not limited to, standard telephones and document imaging devices such as facsimile machines. A configuration using a terminal adapter 104 is common where the analog telephone 102 is located in a residence or business In addition, a customer could utilize a computer that is running IP telephony software 106 to place and receive IP based telephone calls, and to access other IP telephony systems (not shown). Here again, the computer running IP telephony software would access the Internet 110 via the data network interface 109. In some instances, the IP telephony software could be assigned its own telephone number. In other instances, the IP telephony software could be associated with a telephone number that is also assigned to an IP telephone 108, or to a terminal adaptor 104 that is connected to an analog telephone 102.

In addition, a mobile computing device which is running IP telephony software could also be used to place and receive telephone calls through the IP telephony system 120. The mobile computing device accesses the Internet 110 via a wireless data network interface 119. The wireless data network interface could be a WiFi or WiMax router, or any other type of wireless data interface device capable of communicating wirelessly with the mobile computing device 137.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. A third party using a cellular telephone 136 could also place a call to an IP telephony system 120 customer, and the connection would be established in a similar manner, although the first link would involve communications between the cellular telephone 136 and a cellular telephone network 130.

A smart phone 138 which includes cellular telephone capabilities could also be used to conduct telephony communications through both the IP telephony system 120 and the cellular network 130. For example, an IP telephony software application running on the smart phone 138 could communicate with the IP telephony system 120 via the Internet 110. The smart phone 138 could access the Internet 110 via the wireless data network interface device 119, or via a data channel of the cellular network 130. Of course, alternate embodiments could utilize any other form of wired or wireless communications paths to enable communications.

Users of the IP telephony system 120 are able to access the service from virtually any location where they can connect to the Internet 110. Thus, a customer could register with an IP telephony system in the U.S., and that customer could then use an IP telephone 108 located in a country outside the U.S. to access the services. Likewise, the customer could also utilize a computer outside the U.S. that is running IP telephony software to access the IP telephony system 120. Further, in some instances a user could place a telephone call with the analog telephone 132 or the cellular telephone 136 that is routed through the PSTN 130 or cellular network 140 to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system 120 network. Thus, the user is able place a long distance call using lower cost IP telephony service provided by the IP telephony system 120, rather than a higher cost service provided by the PSTN 130 or cellular network 130.

Figure 2:
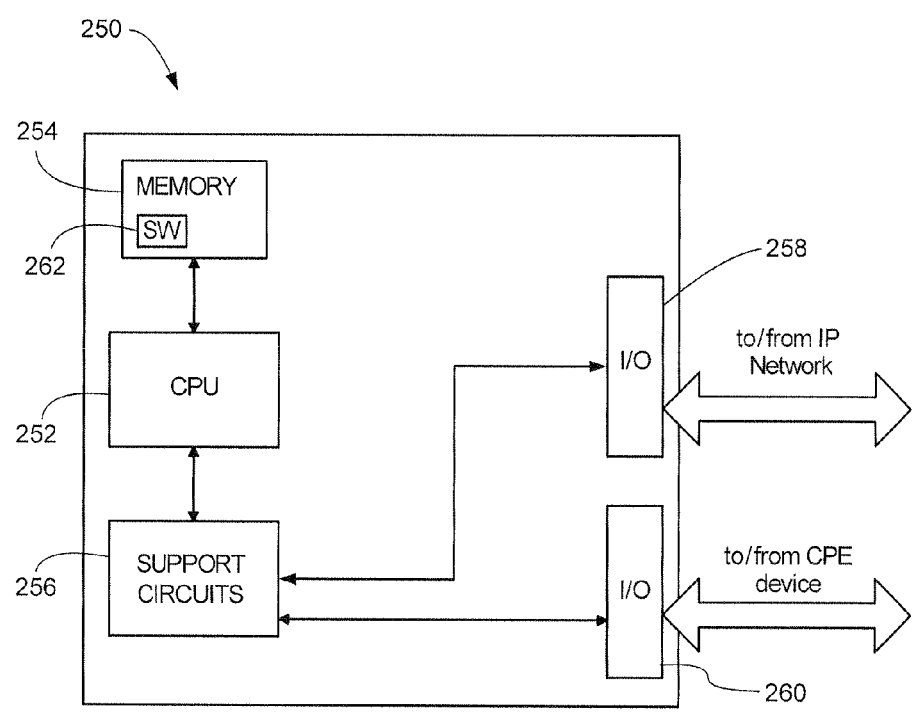
FIG. 2 is a diagram of various elements of a processor that forms part of an IP telephony system or an IP telephony device according to an embodiment of the invention.

FIG. 2 illustrates elements of a computer processor 250 that can be used as part of the IP telephony system 120 or a telephony device to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

References to an "IP telephony device" appear in both the foregoing and following descriptions. This term is used to refer to any type of device which is capable of interacting with an IP telephony system to conduct a communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
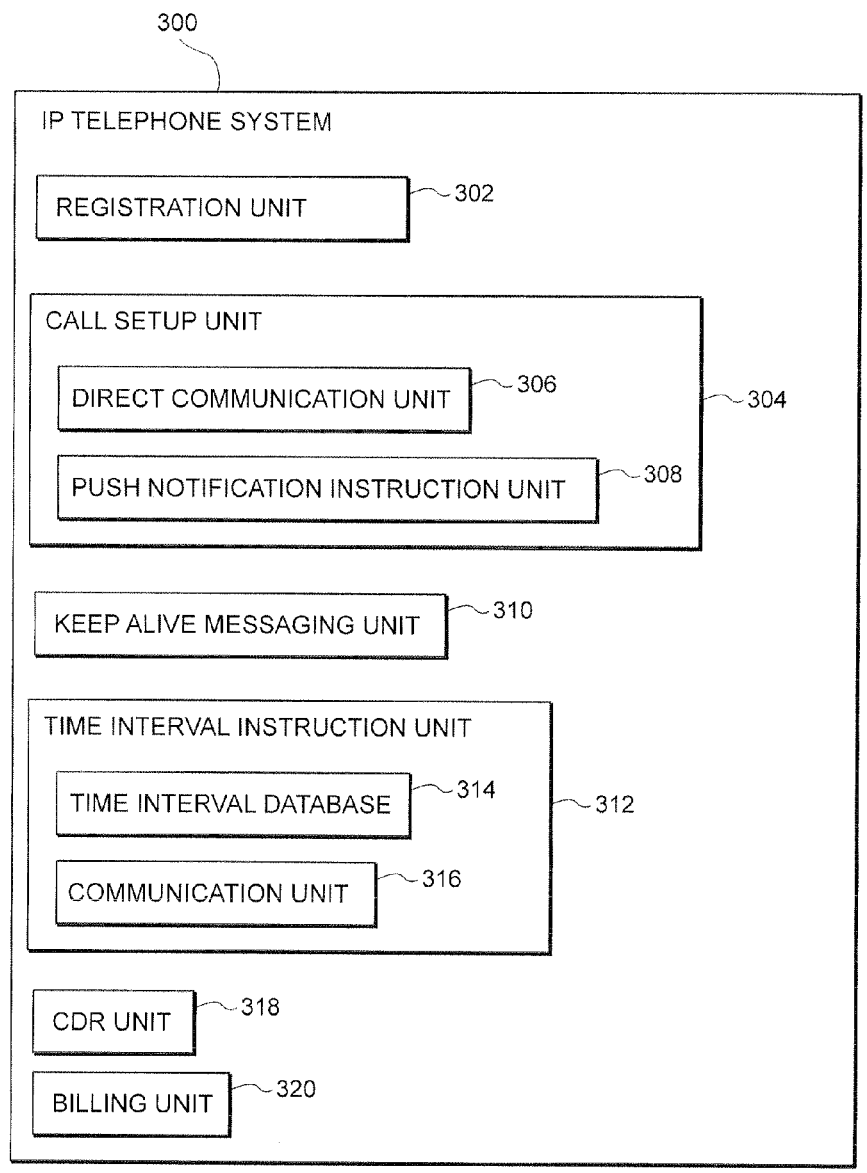
FIG. 3 is block diagram illustrating various elements of an IP telephony system according to an embodiment of the invention.

FIG. 3 illustrates selected elements of an IP telephony system 300 according to one embodiment of the invention. The IP telephony system 300 includes a registration unit 302 which is responsible for registering a user's telephony device, or IP telephony software application, when the user's telephony device or IP telephony software application wishes to communicate over the IP telephony system 300. The IP telephony system 300 also includes a call setup unit 304, which is responsible for setting up telephony communications to and from user telephony devices, or IP telephony software applications. The call setup unit 304 includes a direct communication unit 306, which communicates directly with a user's telephony device or an IP telephony software application. The call setup unit 304 also includes a push notification instruction unit 308, which is responsible for causing a push notification to be sent to a user's telephony device if the direct communication unit 306 cannot directly communicate with a user's telephony device or an IP telephony software application because a pinhole of a data network interface device has closed.

The IP telephony system 300 also includes a keep alive messaging unit 310. The keep alive messaging unit is responsible for sending and/or receiving communications from a user's telephony device, or an IP telephony software application, for purposes of keeping a pinhole of a data network interface device open. The keep alive messaging unit 310 may also interact with a user telephony device or an IP telephony software application to help determine a desirable time interval for sending keep alive messages from the user's telephony device or IP telephony software application, as will be described in more detail below.

The IP telephony system 300 further includes a time interval instruction unit 312. The time interval instruction unit 312 includes a time interval database 314 which stores desirable time intervals for sending keep alive messages through various different data network interface devices. One or more identifiers for each data network interface device are indexed against one or more desirable time intervals for sending keep alive messages. A communication unit 316 of the time interval instruction unit 312 receives the information that is stored in the time interval database 314. The communication unit 316 also responds to requests for desirable time intervals which are received from various user telephony devices or IP telephony software applications.

The IP telephony system 300 also includes a CDR unit 318 which stores information about telephony communications that are handled by the IP telephony system 130. A billing unit 320 uses the information in the CDR unit 318 to bill for the communications handled by the IP telephony system 300.

Figure 4:
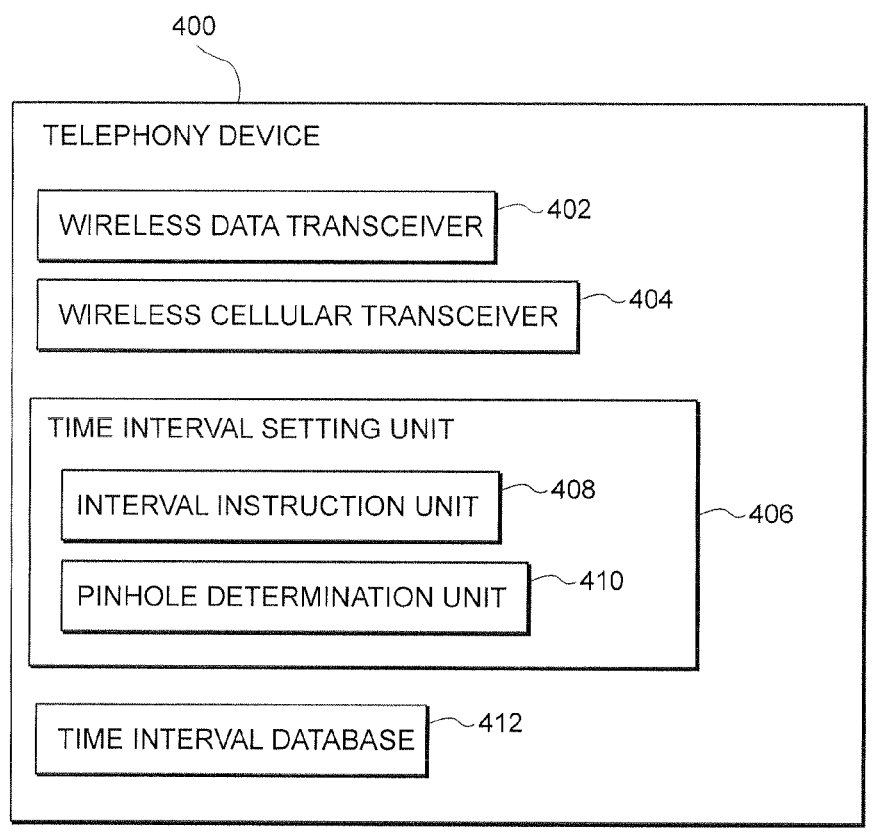
FIG. 4 is a block diagram of various elements of a telephony device according to an embodiment of the invention.

FIG. 4 illustrates a user telephony device 400 according to one embodiment of the invention. In this embodiment, the user telephony device 400 includes both a wireless data transceiver 402 and a wireless cellular transceiver 404. This would be typical for a smart phone that is capable of communicating via a cellular telephony system, and via a WiFi interface. However, in alternate embodiments, a user telephony device may have only the wireless data transceiver 402, or only the wireless cellular transceiver 404.

The user telephony device 400 also includes a time interval setting unit 406 that is configured to determine a desirable time interval for sending keep alive messages in any given environment. The time interval setting unit 406 includes an interval instruction unit 408 that informs a network server about the frequency at which messages should be sent to the telephony device 400 for purposes of determining a desirable time interval for keep alive messages. Once a desirable time interval has been determined, the interval instruction unit 408 may also provide instructions to a network server about how frequently to send communications to the telephony device 400 for purposes of ensuring that a pinhole of a data network interface device never closes. The time interval setting unit 406 also includes a pinhole determination unit 410 that determines when a pinhole of a data network interface device has closed. The operations performed by the time interval setting unit 406 will be described in more detail below.

The time interval setting unit 406 could be implemented in an IP telephony software application that is loaded on and run by a user telephony device.

The telephony device 400 may optionally include a time interval database 412 which stores desirable time intervals for sending keep alive messages against the identifiers of various data network interface devices. Each time that the time interval setting unit 406 determines a desirable time interval for a particular data network interface device, that information may be stored in the time interval database 412 against one or more identifiers associated with the data network interface device.

FIGS. 5A-5D illustrate how message traffic is sent to and received from an IP telephony device or an IP telephony software application during a process of determining a desirable time interval for sending keep alive messages to prevent a pinhole of a data network interface device from closing. References will be made to FIGS. 5A-5D in the following description of the methods illustrated in FIGS. 6 and 7.

Figure 6:
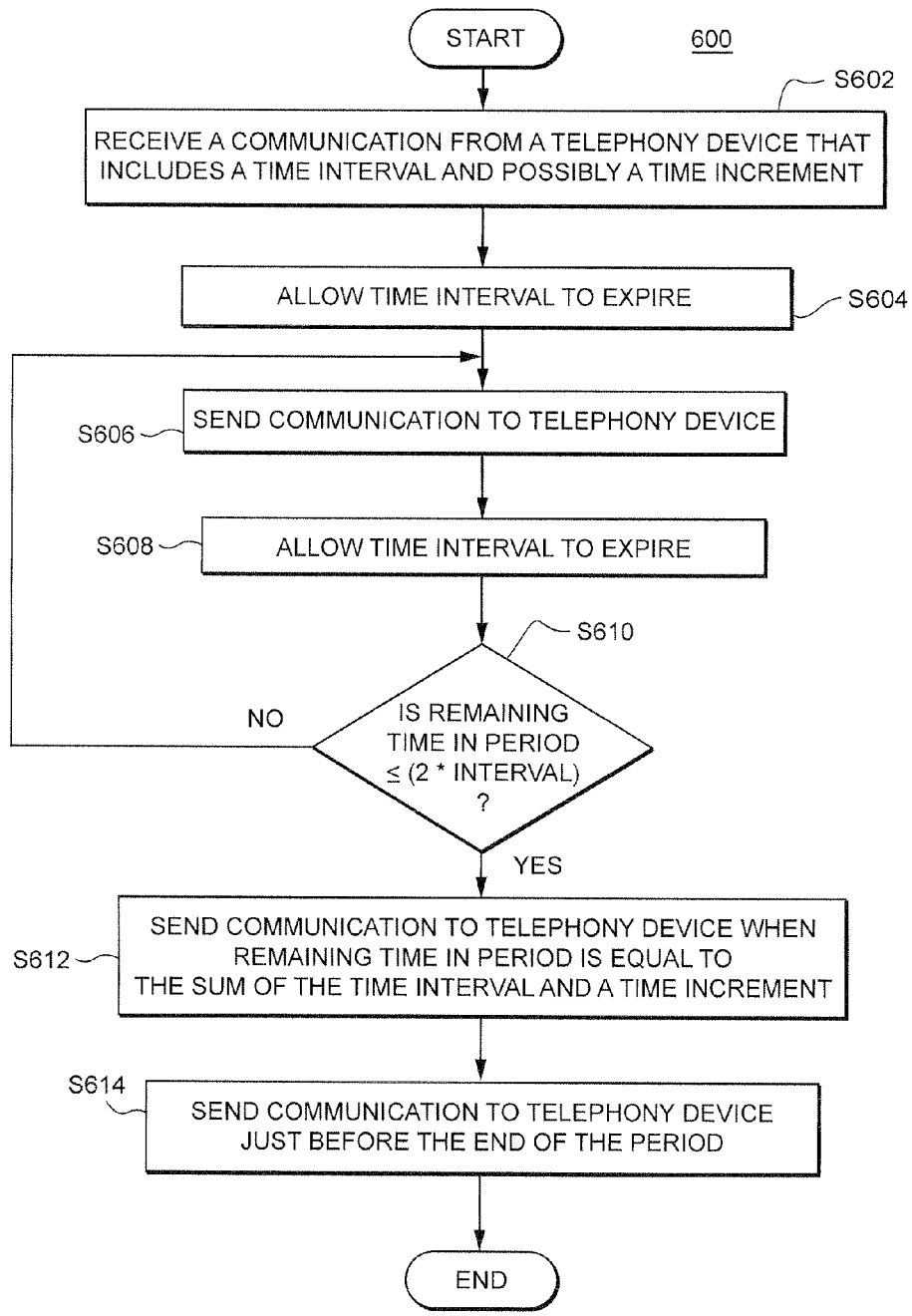
FIG. 6 is flowchart illustrating steps that would be performed by a network server during performance of a method according to the invention.
Figure 7:
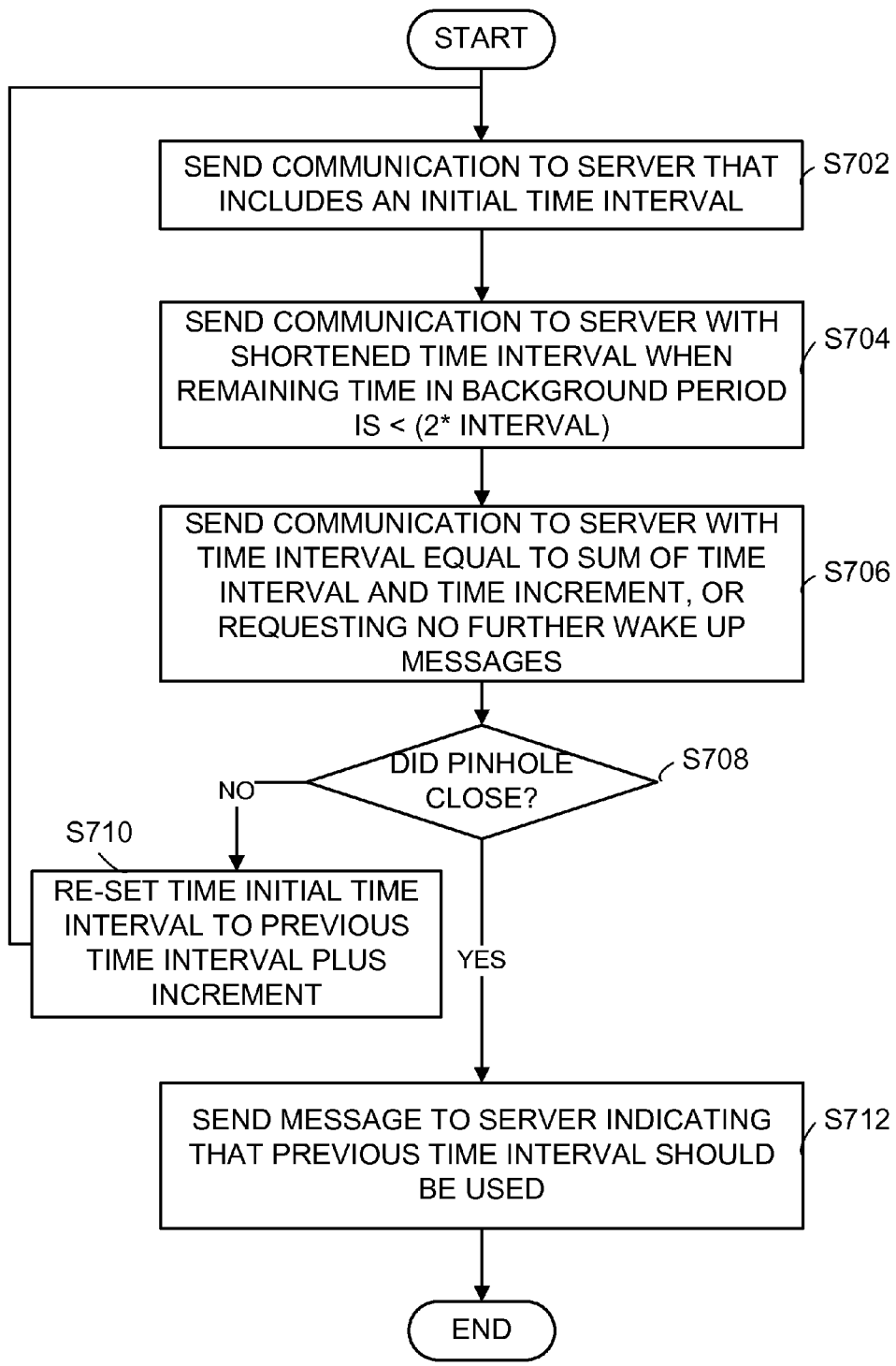
FIG. 7 is a flowchart illustrating steps that would be performed by a user's portable computing device during performance of a method according to the invention.

FIGS. 6 and 7, together, illustrate steps of a method used to determine a desirable time interval for sending keep alive messages that prevent a pinhole of a data network interface device from closing. FIG. 6 illustrates the steps that are performed by a server of an IP telephony system, and FIG. 7 illustrates the steps that are performed by the time interval setting unit 406 of a telephony device or an IP telephony software application.

We begin by assuming that a user's mobile telephony device or a portable computing device running an IP telephony software application is communicating with an IP telephony system server via a data network interface device. The data network interface could be a wired or wireless data network interface device. In many instances, it would be a wireless data network interface device that is communicating with either a wireless data transceiver 402 or a wireless cellular data transceiver 404 of the user's telephony device.

As explained above, to keep the pinhole of a data network interface device open, it is necessary for a user's telephony device to send messages to an IP telephony system server at intervals which are shorter than the duration of the pinhole timer. By doing so, the user's telephony device ensures that the pinhole timer is reset before it expires. This prevents the data network interface device from blocking incoming communications sent from the IP telephony system server. It is also desirable to send the communications as infrequently as possible, to thereby reduce battery drain.

Because different data network interface devices can have different duration pinhole timers, it is impossible to know in advance the duration of the pinhole timer for a particular data network interface device. The method described below is performed to determine a time interval which will keep the pinhole open, but help to reduce battery drain.

The basic concept is to start with a short duration time interval for the transmission of keep alive messages, the short duration time interval ensuring that the pinhole of substantially all data network interfaces will remain open. Next, a slightly longer interval is used. The interval is gradually lengthened, until the interval between keep alive messages is too long, and the pinhole closes. At this point, the next-shortest time interval, which was sufficient to keep the pinhole open, is chosen as the desirable time interval for purposes of sending keep alive messages through the data network interface device.

However, the situation is somewhat more complex. For purposes of this example, we will assume that an IP telephony software application loaded and running on a smart phone is being used to implement IP telephony communications with an IP telephony system. The IP telephony software application would embody the time interval setting unit 406 of the telephony device 400 illustrated in FIG. 4.

Further, we will assume that the operating system of the smart phone allows a software application to be moved to the "background," to reduce, as much as possible, the resources that the software application uses, and thus the battery drain caused by the software application. However, once the software application is moved to the background, the operating system will only allow the software application to be brought back to the foreground after a period of 10 minutes or longer has expired.

Once the IP telephony software application is moved to the background, it is not able to autonomously send a new communication to the IP telephony system server until the ten minute period has expired, and the IP telephony software application is brought back to the foreground. Most data network interface devices have a pinhole timer duration that is less than ten minutes. As a result of these two facts, it would appear that it is impossible for the IP telephony software application to be moved to the background, which saves power, and for outgoing communications to the IP telephony system server to be sent frequently enough to keep the pinhole of a data network interface device open. However, another mechanism of the operating system can be exploited to make this possible.

The operating system of the smart phone will allow an external device, such as an IP telephony system server, to send a wake up message that causes a software application that is in the background to be brought back to the foreground before the regular ten minute period expires. Although this will result in greater battery drain than if the software application remained in the background for the entire ten minute period, it makes it possible to keep the pinhole timer associated with the IP telephony system server open. Basically, a wakeup message sent from the IP telephony system server to the user's telephony device triggers the automatic generation of an acknowledgment message which is sent from the user's telephony device to the IP telephony system server. And the acknowledgement message serves to re-set the pinhole timer associated with the IP telephony system server. It is still be desirable to wake up the IP telephony software application as seldom as possible, while still ensuring that the pinhole never closes, to reduce battery drain as much as possible. The method described below accomplishes these purposes.

In the following method, an IP telephony system server and a software application on a user's telephony device communicate back and forth to keep the pinhole of a data network interface device open, and to determine an optimum time interval for keep alive messages. The steps illustrated in FIG. 7 are performed by the software application on the user's telephony device. The method 700 begins and proceeds to step S702, where the software application sends a communication to the IP telephony system server. The communication sent from the software application includes an initial time interval. Thus, in this embodiment, it is the software application on the user's telephony device which is responsible for determining the time intervals at which an IP telephony system server sends wake up messages to a user's telephony device. The communication may also include a time increment, the purpose of which is discussed below.

The steps illustrated in FIG. 6 are performed by the server of an IP telephony system. The method 600 begins and proceeds to step S602 where the server receives the communication sent from the software application on the user's telephony device, which includes the initial time interval. As noted, the communication may also include a time increment.

The communication sent from the software application and received by the IP telephony system server could be a regular SIP communication, such as a SIP REGISTER message. The time interval could be included in a header field of the SIP REGISTER message which is not being used for any other purpose. Of course, the communication could be an alternate type of SIP message. Likewise, the communication need not be a SIP signaling message.

The software application sends the communication to the IP telephony system server just before it requests that the operating system send the software application to the background. FIGS. 5A-5D illustrate the messages passing back and forth between the software application and the IP telephony system server during a ten minute background period during which the software application is moved to the background, for purposes of minimizing power consumption. The software application also requests that the operating system bring the software application back to the foreground at the end of the ten minute background period.

Figure 5A:
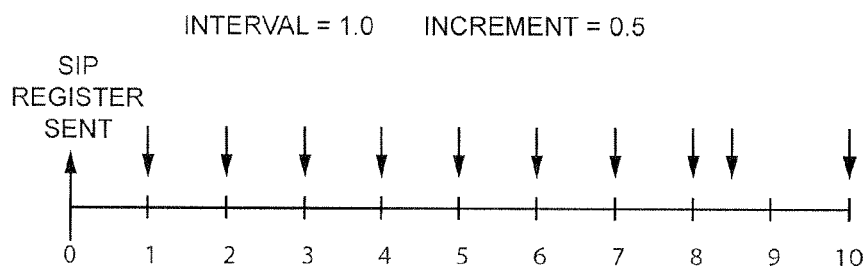
FIGS. 5A-5D illustrate message traffic that occurs during a process designed to determine an optimum time interval for sending keep alive messages according to an embodiment of the invention.

FIG. 5A illustrates the sequence of messages that will occur when the message sent from the software application to the IP telephony system server specifies an initial time interval of one minute. Almost all data interface devices will have a pinhole timer that is longer than one minute. Thus, sending keep alive messages at this interval should ensure that the pinhole remains open.

The upward arrow on the left-hand side of FIG. 5A, at time zero, represents the software application sending a SIP REGISTER message including the one minute initial time interval to the IP telephony system server at the beginning of the ten minute background period during which the software application is to be moved to the background. This corresponds to step S702 in FIG. 7.

Ideally, the software application on the user's telephony device is responsible for telling the IP telephony system server when to send wake up messages. The IP telephony system server then simply sends wake up messages as instructed by the software application. The IP telephony system server may be sending wake up messages to multiple different user telephony devices at various different time intervals over the same period time. By having the software application on each telephony device determine when it needs to receive its next wake up message, and so instructing the IP telephony system server, the IP telephony system server can simply respond as instructed. This eliminates the need for the IP telephony system server to track multiple different intervals at which wake up messages are to be sent to multiple different user telephony devices.

Next, in step S604, the IP telephony system server waits for the specified initial time interval of one minute to expire. In step S606, the IP telephony system server then sends a wake up message to the software application on the user's telephony device. The wake up message could be a SIP NOTIFY message, or some other sort of message. Regardless, when the wake up message is received at the telephony device, an acknowledgment message is automatically sent from the telephony device, through the data interface device, to the IP telephony system server. This outgoing acknowledgement message causes the data network interface device to re-set its pinhole timer.

The wake up message will also cause the software application to be briefly brought to the foreground. At this point, the software application may perform a small task, such as sending a new message to the IP telephony system server. In fact, a message sent from the software application to the IP telephony system server could be the mechanism used to keep the pinhole open, rather than an acknowledgment message sent in response to the wake up message. Also, a message sent from the software application to the IP telephony system server may instruct the IP telephony system server of a new time interval for sending the next wake up message. But because there is no actual task for the software application to perform, the software application is rapidly placed back into the background.

In step S608, the IP telephony system server again waits for the specified initial time interval of one minute to expire. At this point, if the remaining time in the ten minute background period is equal to or greater than twice the specified time interval, the method proceeds back to step S606, and another wake up message is sent to the software application on the user's telephony device. This again triggers the telephony device to send an acknowledgement message back to the IP telephony system server, which serves to re-set the pinhole timer on the data network interface device. Or, as mentioned above, a message sent from the software application to the IP telephony system server may serve to keep the pinhole open. This process repeats each time a one minute time interval expires, as illustrated by the downward arrows in FIG. 5A, until the remaining time in the ten minute background period is less than or equal to twice the time interval. As a result, the pinhole timer is re-set every minute, ensuring that communications from the IP telephony system server will always be delivered through the data network interface device to the software application.

When the software application is brought to the foreground when the remaining time in the ten minute background period is equal to or less than twice the time interval, the software application sends a new message to the IP telephony system server informing the IP telephony system server that it wishes to receive a wake up message after a new, shorter time interval expires. In this instance, this occurs when the software application is brought to the foreground at approximately the eight minute mark. Step S704 in FIG. 7 correspond to the software application sending a message to the IP telephony system server with the new shortened time interval.

The basic concept is to have the IP telephony system server send the next wake up message to the user's telephony device when the amount of time remaining in the background period is equal to the initial time interval (in this instances, one minute) plus a time increment. The time increment is intended to be smaller than the smallest time interval. In this example, the time increment is set at thirty seconds, or 0.5 minutes. Thus, we wish for the IP telephony system server to send the next wake up message to the user's telephony device when the remaining amount of time in the background period is approximately 1.5 minutes. This means that the next wake up message must be sent to the user's telephony device at the 8.5 minute mark, which is 0.5 minutes in the future.

Based on the above calculations, when the software application is brought to the foreground at the 8 minute mark, in step S704 it sends a communication to the IP telephony system server instructing the IP telephony system server to send the next wake up message in 0.5 minutes. The software application is then returned to the background. The method proceeds to set S612, and the IP telephony system server sends the next wake up message to the user's telephony device 0.5 minutes later, when the remaining time in the ten minute background period is equal to the sum of the time interval and the time increment—or 1.5 minutes. As illustrated in FIG. 5A, the IP telephony system server sends a wake up message to the software application at the 8.5 minute mark.

When the software application is brought to the foreground at the 8.5 minute mark, in some instances, it will send a communication to the IP telephony system server instructing the IP telephony system server to send the next wake up message to the user's telephony device in 1.5 minutes, which is the sum of the time interval and the time increment. This is step S706 of the method illustrated in FIG. 7. The method proceeds to step S614, and the IP telephony system server sends a final wake up message to the user's telephony device just before the ten minute background period expires. If the software application receives this last wake up message, and is brought to the foreground before the background period expires, it will mean that the pinhole timer on the data network interface device did not expire during the 1.5 minute time period that elapsed between the next-to-last wake up message, and the last wake up message. That would mean that the pinhole timer of the data network interface device is longer than 1.5 minutes.

On the other hand, if the software application is brought to the foreground at the end of the ten minute background period by the operating system, and the software application determines that it never received the last wake up message, this would mean that the pinhole of the data network interface device closed during the 1.5 minute time period that elapsed between the next-to-last wake up message, and the last wake up message. That would mean that the pinhole timer of the data network interface device is shorter than 1.5 minutes.

An alternate method of determining if the duration of the pinhole timer is longer or shorter than 1.5 minutes could be accomplished without the need for the IP telephony system server to send a final wake up message just before the end of the ten minute background period. In this alternate method, everything would proceed as described above, until the software application is brought to the foreground at the 8.5 minute mark. At that point in time, in step S706, the software application instructs the IP telephony system server to either not send any additional wake up messages, or to send the next wake up message after a time interval that is longer than 1.5 minutes. As a result, step S614 in FIG. 6 would not actually be performed.

Under this alternate implementation, the software application goes into the background after the 8.5 minute mark, and the remaining 1.5 minutes of the background period is allowed to expire. At the end of the ten minute background period, the operating system brings the software application back to the foreground. The software application then attempts to register with the IP telephony system server. One can note the port number of the data network interface device which is used to send that registration message to the IP telephony system server. If the port number is the same as the port number used for the previous messages sent from the software application to the IP telephony system server, this would mean that the pinhole never closed, and that the duration of the pinhole timer is longer than 1.5 minutes. Alternatively, if the registration message uses a new port number of the data network interface device, this would mean that the original pinhole closed, indicating that the duration of the pinhole timer is less than 1.5 minutes.

Of course, in still other embodiments, both of the alternative methods described above could be used together to determine if the duration of the pinhole timer is greater than or less than the 1.5 minute period, which represents the sum of the time interval and time increment.

In step S708 of the method illustrated in FIG. 7, the software application and/or the IP telephony system server determine if the pinhole closed during the 1.5 minute period that elapsed at the end of the background period using any of the methods discussed above. If the pinhole closed, in step S712 the software application sends a communication to the IP telephony system server indicating that the time interval of one minute should henceforth be used for sending wake up messages to the software application.

Figure 5B:
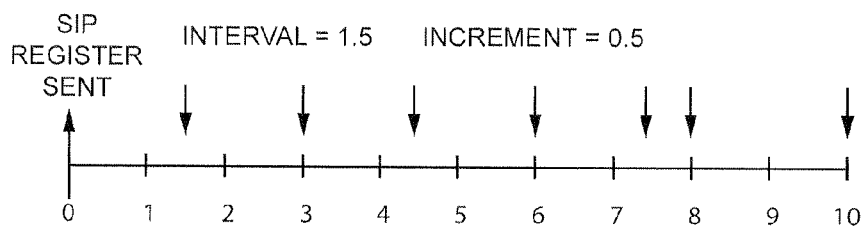

On the other hand, if the check performed in step S708 indicates that the pinhole did not close, the method proceeds to step S710, and a new initial time interval is set, the new initial time interval being equal to the previous time interval (one minute) and the time increment (thirty seconds). This is done in recognition of the fact that the duration of the pinhole timer of the data network interface must be longer than 1.5 minutes. The method then loops back to step S702, and the software application sends a new communication to the IP telephony system server that includes the new initial time interval of 1.5 minutes. The method then basically repeats using this new initial time interval, as illustrated in FIG. 5B.

More specifically, during the second iteration, in step S702 the software application sends a new SIP register message to the IP telephony system server with the new 1.5 minute initial time interval in a header field, and then goes into background on the user's telephony device. The IP telephony system server sends a wake up message to the software application each time the new initial 1.5 minutes period expires, as illustrated by the downward arrows in FIG. 5B, until a message is sent at time 7.5 minutes. At that point, the amount of time remaining in the ten minute background period is less than twice the initial time interval (which is now 1.5 minutes). As a result, the software application determines an amount of time equal to the current time period (1.5 minutes) plus the time increment (thirty seconds), which would be two minutes. In step S704 the software application sends a message to the IP telephony system server requesting that the IP telephony system server send the next wake up message in 0.5 minutes, which will result in the wake up message being sent when the amount of time remaining in the background period is two minutes, the sum of the current time interval (1.5 minutes) and the increment (0.5 minutes). The software application goes to background, and then in step S612 the IP telephony system server sends the next wake up message 0.5 minutes later, at the 8.0 minute mark.

When the software application is brought to the foreground at the 8.0 minute mark, depending on how the system is configured, in step S706 the software application will send a message to the IP telephony system server requesting that no further wake up message be sent, or that a final wake up message be sent just before the end of the background period. The software application then goes to background, and a two minute period is allowed to expire. If the IP telephony system server was instructed to send a last wake up message, this occurs two minutes later, just before the end of the background period in step S614.

In step S708, a check is again performed to determine if the pinhole closed during the two minute period that expired at the end of the background period using any of the methods described above. If the pinhole did expire, in step S712 the software application instructs the IP telephony system server to henceforth use an interval of 1.5 minutes for sending wake up messages. On the other hand, if the pinhole time did not close during a two minute period, the method proceeds to step S710, and a new initial time interval is calculated as the sum of the previous initial time interval (1.5 minutes) and the time increment (0.5 minutes). Thus, the new initial time interval is set at 2.0 minutes, and the process again repeats using an initial time interval of two minutes, as illustrated in FIG. 5C.

Figure 5C:
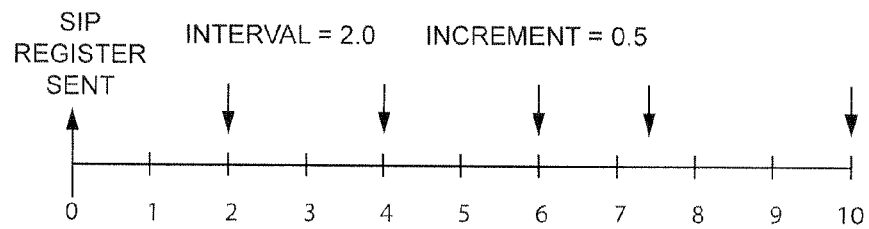
Figure 5D:
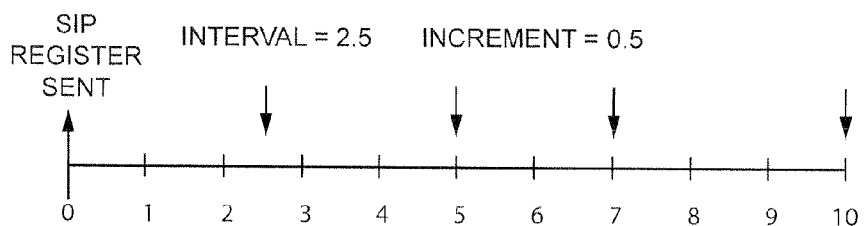

As shown in FIG. 5C, during this iteration of the process, the period of time that the software application remains in the background at the end of the background period is 2.5 minutes. And for purposes of this explanation, we assume that the pinhole remains open during this 2.5 minute period, which means that the pinhole timer has a duration of more than 2.5 minutes. As a result, the method is again repeated, this time with an initial time interval of 2.5 minutes, as illustrated in FIG. 5D.

In this last iteration of the process, the software application remains in the background for a period of 3.0 minutes at the end of the background period. And when the check is performed in step S708, it is determined that the pinhole closed during this 3.0 minute period. As a result, the method illustrated in FIG. 7 proceeds to step S712, and the software application sends a communication to the IP telephony system server indicating that the previous time interval of 2.5 minutes should be used for sending all future wake up messages.

In the methods described above, the time interval is gradually lengthened until the pinhole of the data network interface device closes. And this allows the software application to determine a desirable time interval for wake up messages. The desirable time interval being short enough to prevent the pinhole from closing, but as long as possible to prevent unnecessary wake ups of the software application to minimize power consumption.

During each iteration of the process, a new longer interval time is used only at the very end of the background time period. Shortly after the expiration of this longer time interval, the software application is brought to the foreground by the operating system, which allows the software application to send a registration message to the IP telephony system server, ensuring that the pinhole is again opened. As a result of this process, during any given iteration of the process, the pinhole will only be closed for a maximum amount of time that is equal to the duration of the time increment. And because the time increment is relatively brief, this ensures that for the majority of the time, the IP telephony system server will be capable of contacting the software application to setup a new incoming telephony communication to the software application.

If the pinhole closes during an iteration of the method, and the IP telephony system server needs to setup a new incoming telephony communication to the software application, the IP telephony system server can still resort to the use of a push notification to wake up of the software application.

Because the software application on the user's telephony device controls when the IP telephony system server sends wake up messages, the IP telephony server does not need to remember or track the time interval being used. The IP telephony system server simply responds to instructions received from the software application. This is advantageous because an IP telephony system server may be simultaneously performing this same method for a large number of individual software applications on a corresponding number of user devices, and it would be difficult to track the state of each process for each different telephony device.

Of course, in alternate embodiments of the invention, the IP telephony system server could make the determination of when to send each wake up message so that the same pattern of wake up messages described above is followed.

Once the software application has determined the desirable time interval to be used with a particular data network interface device, the message sent in step S712 informs the IP telephony system server to henceforth send wake up messages according to the determined desirable time interval.

In some embodiments, the IP telephony system server uses the same time increment when performing all iterations of this method for all software applications. In alternate embodiments, the time increment may vary during different iterations of the method.

If the method described above is repeated multiple times, with increasing duration time intervals, the method may ultimately determine that the duration of a pinhole timer for a data network interface device is longer than the background period. If that is the case, there would be no need for the IP telephony system server to send wake up messages to the software application, because the normal process of bringing the software application back to the foreground will result in communications being sent to the IP telephony system server before the pinhole closes.

Because multiple iterations of the process may be needed to determine the desirable time interval for wake up messages, there is a reasonable chance that the user's regular use of the software application may interrupt the process before it is able to determine the desirable time interval. Also, the user may power down the telephony device while the process is ongoing. Further, the user may move to a new location during the performance of the method, resulting in the telephony device connecting to the Internet through a new and different data network interface device.

For all the above-listed reasons, the software application may be configured to remember the last interval that was used during a last iteration of the method, and the last interval would be specific to an individual data network interface device. If the software application is interrupted during the performance of this method, once the interrupting activity is concluded, the software application can return to the method and continue with the next time interval. Likewise, if the user moves to a new location, causing the telephony device to switch from a first data network interface device to a second data network interface device, the software application remembers the last interval used with the first data network interface device. If and when the telephony device again connects to the Internet through the first data network interface device, the method can proceed with first data network interface device with the next larger time interval.

In still other embodiments of the invention, multiple instantiations of the above described process could be conducted concurrently by the software application and the IP telephony system server. Each concurrent instantiation of the process could be using a different duration initial time interval. When multiple instantiations of the process are conducted concurrently, one may arrive at a faster determination of the optimum time interval to be used with a particular data network interface device. On the other hand, this may place heavy processing demands on the user's telephony device and the IP telephony system servers.

As mentioned above, each data network interface device could have a different duration pinhole timer. Thus, the desirable time interval for each data network interface device can be different. Once the software application has identified a desirable time interval for a particular data network interface device, that desirable time interval is stored internally on the telephony device. Each time that the user's telephony device connects to the same data network interface device in the future, the software application can immediately being using the desirable time interval.

In some embodiments, once the software application determines a desirable time interval for a particular data network interface device, the software application reports this information to the IP telephony system. The desirable time interval is reported along with at least one identifier for the data network interface device. In some instances, the identifier could be a service set identification number (SSID) or a media access control (MAC) address of the data network interface device. In other instances, the Internet Protocol (IP) address presently assigned to the data network interface device could be used to identify the data network interface device. In other instances, a different type of identifier could be used. For example, a geographical identifier of some type may be assigned to elements of a cellular telephony system that provides a user telephony device with access to a data network. Also, the identification number of a cellular base station could be used.

Figure 8:
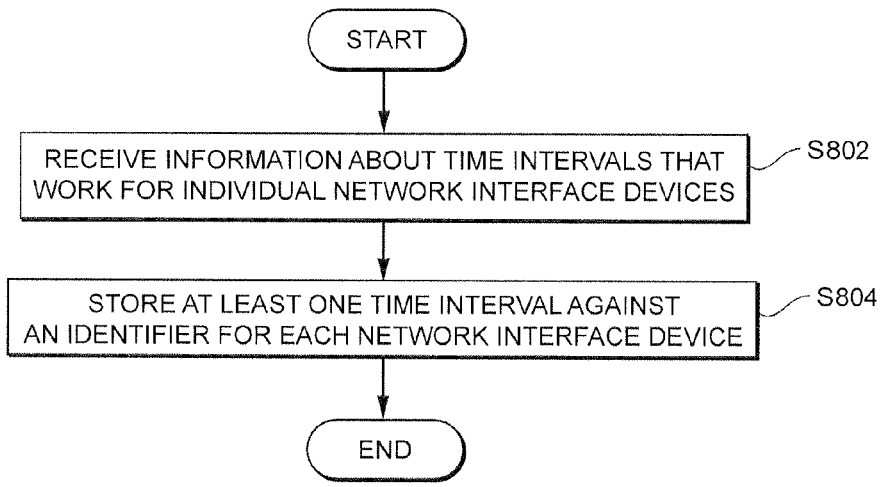
FIG. 8 is a flowchart illustrating steps of a method of recording desirable time intervals for sending keep alive messages for a plurality of network interface devices.

FIG. 8 illustrates steps of a method 800 that would be performed by one or more elements of an IP telephony system to receive and store desirable time interval information for data network interface devices. The method 800 begins and proceeds to step S802, where a communication unit 316 of a time interval instruction unit 312 receives information about a desirable time interval for use with a particular data network interface device. The received information includes one or more identifiers for the data network interface device. In step S804, the desirable time interval information is stored in a time interval database 314 of the time interval instruction unit 312. One or more time intervals for each data network interface device would be stored against any identifiers for the data network interface device.

Figure 9:
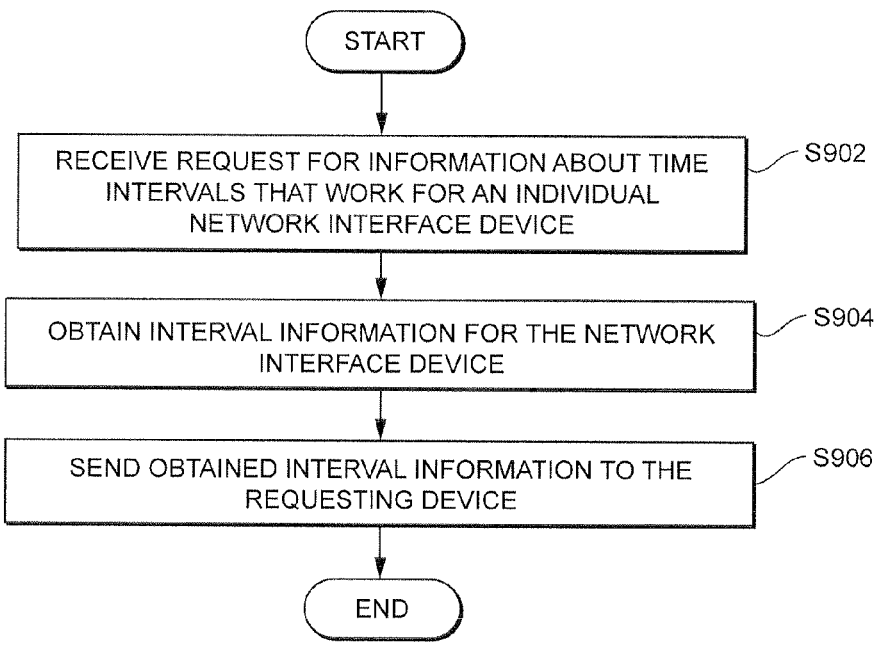
FIG. 9 is a flowchart illustrating steps of a method of providing information about desirable time intervals for sending keep alive messages to ensure a pinhole of a data network device remains open.

Once the desirable time intervals are stored centrally by the IP telephony system, this information can be sent to individual user telephony devices so that they can rapidly begin using the desirable time interval for whatever data network interface device they are presently using. FIG. 9 illustrates a method 900 that would be performed by one or more elements of an IP telephony system to provide desirable time interval information to user telephony devices.

The method 900 begins and proceeds to step S902, where the communication unit 316 of the time interval instruction unit receives a request for information about the desirable time interval for a particular data network interface device. This request would likely be received from a software application on a user's telephony device. The request would include some identifying information for the data network interface device. In step S904, information about a desirable time interval for the data network interface device is retrieved from the time interval database 314. In step S906, this desirable time interval information is provided to the requesting entity by the communication unit 316.

If a user's telephony device is able to obtain desirable time interval information from a time interval instruction unit 312 of a telephony system, there is no need to conduct the process described above to determine a desirable time interval for keep alive messages. Instead, the telephony device can immediately being using a time interval which serves to keep the pinhole of the data network interface device open, and which also serves to minimize power consumption.

In some embodiments, a date may also be recorded in each entry in the time interval database 314, the date being the date that the time interval information was first recorded in the database. Once a significant amount of time has passed, the time interval information could be considered suspect, since the settings of the data network interface may have changed. For example, once a desirable time interval for a particular data network interface device has been in the time interval database 314 for three months, it may be desirable to have a telephony device connected through the data network interface device repeat the process of determining the desirable time interval. This would ensure that the data in the time interval database 314 remains up-to-date.

If the pinhole timer of a data network interface device is shortened after an optimum time interval is calculated for the data network interface device, the next time that a user telephony device makes use of the data network interface device (using the previously calculated optimum interval), the pinhole will likely close. If that occurs, it will trigger the software application to initiate a new performance of the above methods to determine a new optimum time interval for the data network interface device.

The above examples involved a user telephony device, or a software application on a user telephony device, communicating with a server of an IP telephony system. However, any computing device that must communicate through a data network interface device that operates a pinhole timer could utilize similar methods to determine a desirable time period for sending keep alive messages. Thus, all of the above concepts apply equally to other types of computing devices communicating with any server via a data network interface device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a software application of a computing device that communicates with a data network via a network interface device that maintains a pinhole timer for incoming communications directed to the computing device, the method being designed to determine a time interval for sending messages that will prevent the pinhole from closing, the method comprising:

sending a first communication to a server via the network interface device before the software application is moved to the background of an operating system of the computing device for a first background period, the first communication indicating a first initial time interval at which the software application wishes to receive wake up messages from the server;

receiving at least one wake up message from the server during the first background period, wherein the receipt of each wake up message causes a message to be sent from the computing device to the server, and wherein a first test wake up message is received at a point in time that is before the end of the first background period by an interval approximately equal to a sum of the first time interval and a time increment; and determining if the pinhole timer of the data network interface device closed during the period of time that elapses between receipt of the first test wake up message and the end of the first background period.

2. The method of claim 1, wherein if the determining step indicates that the pinhole timer expired during the period of time that elapses between receipt of the first test wake up message and the end of the first background period, the method further comprises sending a communication to the server before subsequent background periods, the communication indicating that wake up messages should be sent to the software application each time that the first initial time interval expires.

3. The method of claim 2, further comprising a step of recording the first initial time interval against an identifier of the network interface device.

4. The method of claim 2, further comprising sending a communication to a server that includes the first initial time interval and an identifier of the network interface device.

5. The method of claim 1, wherein the step of sending a communication comprises sending a Session Initiation Protocol (SIP) REGISTER message to the server.

6. The method of claim 5, wherein the SIP REGISTER message includes the first initial time interval in a header field of the SIP REGISTER message.

7. The method of claim 1, wherein the step of sending a communication comprises sending a communication to the server that also includes the time increment.

8. The method of claim 7, wherein the step of sending a communication comprises sending a Session Initiation Protocol (SIP) REGISTER message that includes the time increment in a first header field of the SIP REGISTER message.

9. The method of claim 1, wherein if the determining step indicates that the pinhole timer did not expire during the period of time that elapses between receipt of the first test wake up message and the end of the first background period, the method further comprises:

sending a second communication to the server just before the software application is moved to the background for a second background period, the second communication indicating a second initial time interval at which the software application wishes to receive wake up messages from the server, the second initial time interval being longer than the first initial time interval; and, receiving at least one wake up message from the server during the second background period, wherein the receipt of each wake up message causes a message to be sent from the computing device to the server.

10. The method of claim 9, wherein the method further comprises:
  receiving a second test wake up message at a point in time that is before the end of the first background period by an interval approximately equal to a sum of the second initial time interval and the time increment; and
  determining if the pinhole timer of the data network interface device closed during the period of time that elapses between receipt of the second test wake up message and the end of the second background period.

11. The method of claim 10, wherein the second initial time interval is equal to a sum of the first initial time interval and the time increment.

12. The method of claim 10, wherein if the determining step indicates that the pinhole timer expired during the period of time that elapses between receipt of the second test wake up message and the end of the second background period, the method further comprises sending a communication to the server before subsequent background periods that indicates that wake up messages should be sent to the software application each time that the second initial time interval expires.

13. The method of claim 1, wherein the method further comprises varying the time increment for different test wake up messages.

14. The method of claim 1, wherein the method further comprises:
  storing the first time interval in association with the network interface device;
  when the computing device in the future connects to the same network interface device, using the stored first time interval.

15. A system, resident on a computing device that communicates with a data network via a network interface device that that maintains a pinhole timer for incoming communications directed to the computing device, the system being configured to determine a time interval for sending messages that will prevent a pinhole of a data network interface device from closing, comprising:
  means for sending a first communication to a server via the network interface device before a software application on the computing device is moved to the background of an operating system of the computing device for a first background period, the first communication indicating a first initial time interval at which the software application wishes to receive wake up messages from the server;
  means for receiving at least one wake up message from the server during the first background period, wherein the receipt of each wake up message causes a message to be sent from the computing device to the server, and wherein a first test wake up message is received at a point in time that is before the end of the first background period by an interval approximately equal to a sum of the first time interval and a time increment; and
  means for determining if the pinhole timer of the data network interface device closed during the period of time that elapses between receipt of the first test wake up message and the end of the first background period.

16. A non-transitory computer readable medium that stores a set of instructions which, when performed by one or more processors of computing device that communicates with a data network via a network interface device, causes the computing device to perform a method that comprises:
  sending a first communication to a server via the network interface device before a software application on the computing device is moved to the background of an operating system of the computing device for a first background period, the first communication indicating a first initial time interval at which the software application wishes to receive wake up messages from the server;
  receiving at least one wake up message from the server during the first background period, wherein the receipt of each wake up message causes a message to be sent from the computing device to the server, and wherein a first test wake up message is received at a point in time that is before the end of the first background period by an interval approximately equal to a sum of the first time interval and a time increment; and
  determining if a pinhole timer of the data network interface device closed during the period of time that elapses between receipt of the first test wake up message and the end of the first background period.

17. The non-transitory computer readable medium of claim 16, wherein if the determining step indicates that the pinhole timer expired during the period of time that elapses between receipt of the first test wake up message and the end of the first background period, the method further comprises sending a communication to the server before subsequent background periods, the communication indicating that wake up messages should be sent to the software application each time that the first initial time interval expires.

18. The non-transitory computer readable medium of claim 17, further comprising a step of recording the first initial time interval against an identifier of the network interface device.

19. The non-transitory computer readable medium of claim 17, wherein the method further comprises sending a communication to a server that includes the first initial time interval and an identifier of the network interface device.

20. The non-transitory computer readable medium of claim 16, wherein the step of sending a communication comprises sending a Session Initiation Protocol (SIP) REGISTER message to the server.

21. The non-transitory computer readable medium of claim 20, wherein the SIP REGISTER message includes the first initial time interval in a header field of the SIP REGISTER message.

22. The non-transitory computer readable medium of claim 16, wherein the step of sending a communication comprises sending a communication to the server that also includes the time increment.

23. The non-transitory computer readable medium of claim 22, wherein the step of sending a communication comprises sending a Session Initiation Protocol (SIP) REGISTER message that includes the time increment in a first header field of the SIP REGISTER message.

24. The non-transitory computer readable medium of claim 16, wherein if the determining step indicates that the pinhole timer did not expire during the period of time that elapses between receipt of the first test wake up message and the end of the first background period, the method further comprises:
  sending a second communication to the server just before the software application is moved to the background for a second background period, the second communication indicating a second initial time interval at which the software application wishes to receive wake up messages from the server, the second initial time interval being longer than the first initial time interval; and
  receiving at least one wake up message from the server during the second background period, wherein the receipt of each wake up message causes a message to be sent from the computing device to the server.

25. The non-transitory computer readable medium of claim 24, wherein the method further comprises:
  receiving a second test wake up message at a point in time that is before the end of the first background period by an interval approximately equal to a sum of the second initial time interval and the time increment; and determining if the pinhole timer of the data network interface device closed during the period of time that elapses between receipt of the second test wake up message and the end of the second background period.

26. The non-transitory computer readable medium of claim 25, wherein the second initial time interval is equal to a sum of the first initial time interval and the time increment.

27. The non-transitory computer readable medium of claim 25, wherein if the determining step indicates that the pinhole timer expired during the period of time that elapses between receipt of the second test wake up message and the end of the second background period, the method further comprises sending a communication to the server before subsequent background periods that indicates that wake up messages should be sent to the software application each time that the second initial time interval expires.

28. The non-transitory computer readable medium of claim 16, wherein the method further comprises varying the time increment for different test wake up messages.

29. The non-transitory computer readable medium of claim 16, wherein the method further comprises:

storing the first time interval in association with the network interface device;

when the computing device in the future connects to the same network interface device, using the stored first time interval.

\* \* \* \* \*